(No Model.) 3 Sheets—Sheet 3.
J. A. MENGEL, G. K. BINKLEY & G. H. GERBER.
POTATO CUTTER AND PLANTER.
No. 606,291. Patented June 28, 1898.
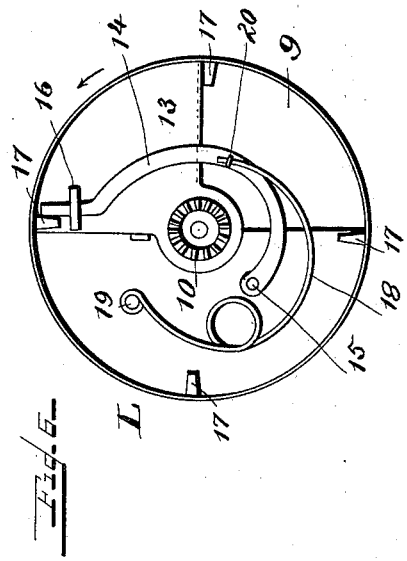
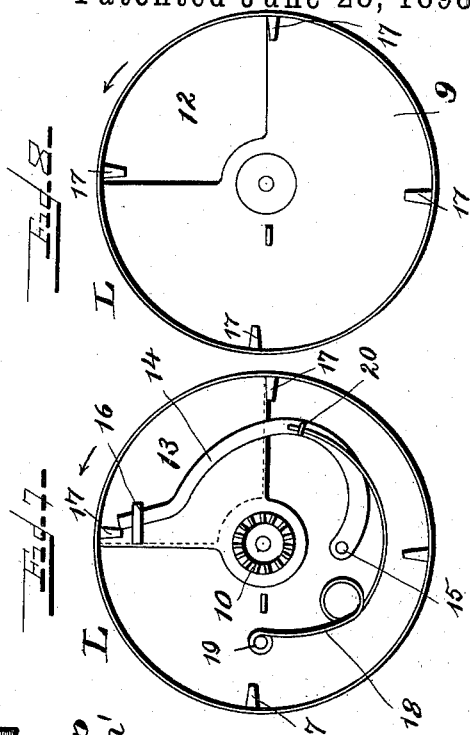
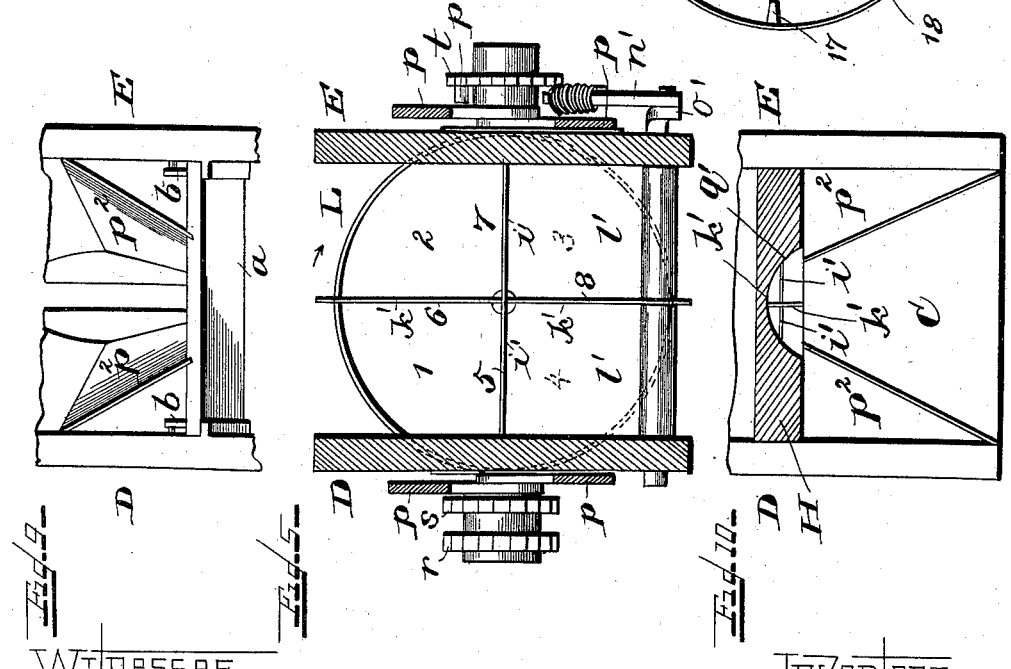

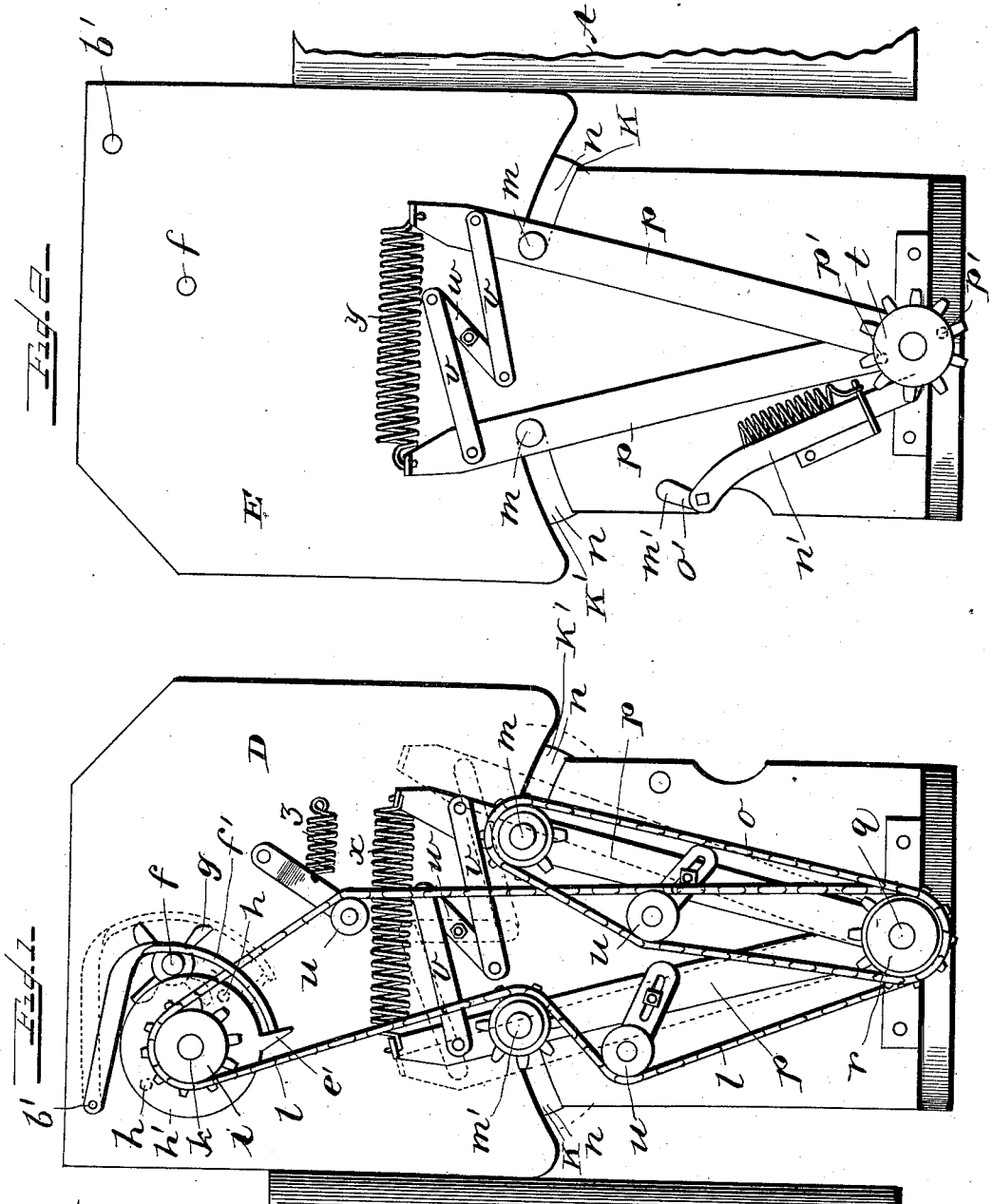

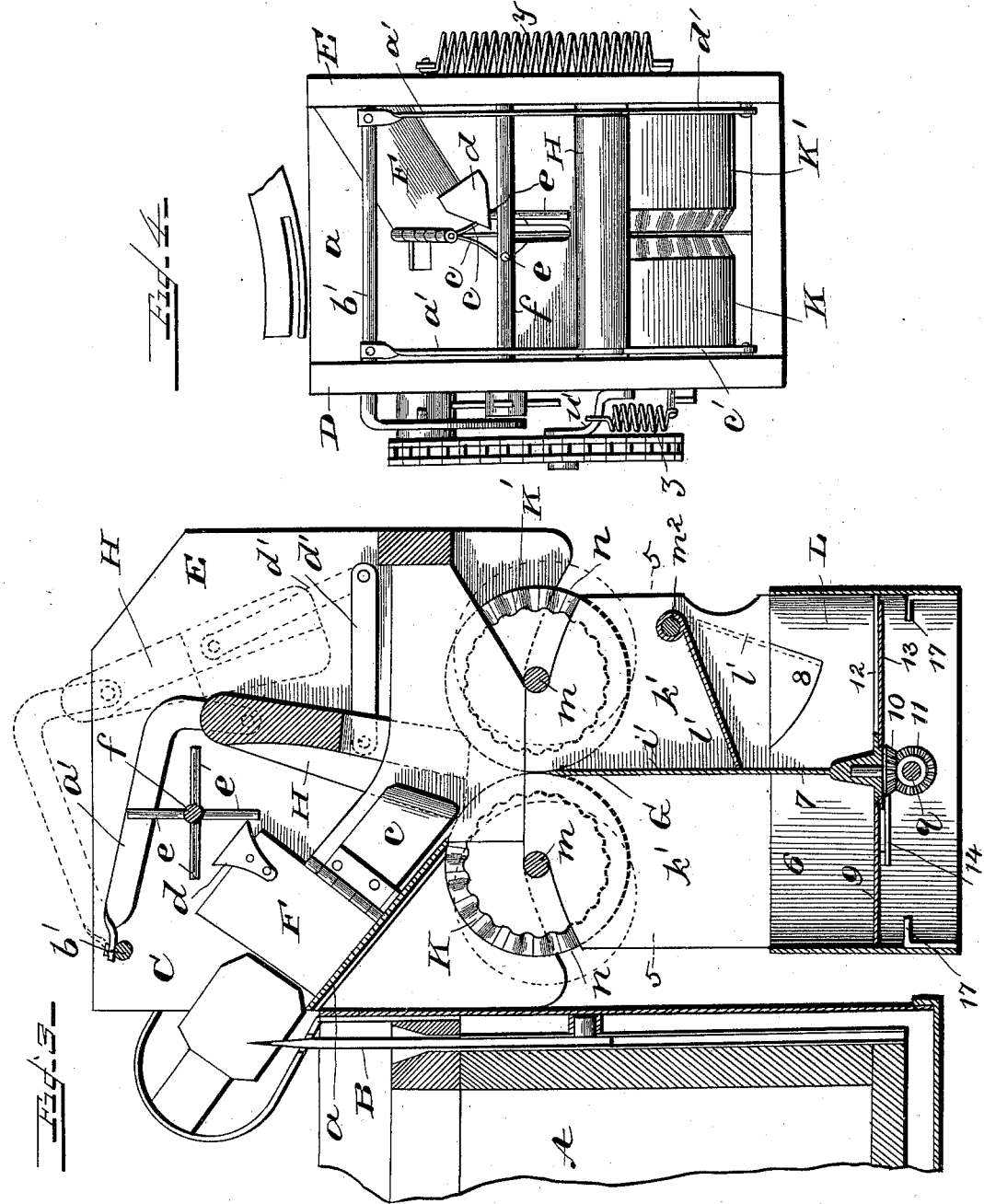

UNITED STATES PATENT OFFICE.

JOSEPH A. MENGEL, OF McKEANSBURG, GEORGE K. BINKLEY, OF ORWIGS-BURG, AND GEORGE H. GERBER, OF POTTSVILLE, PENNSYLVANIA.

POTATO CUTTER AND PLANTER.

SPECIFICATION forming part of Letters Patent No. 606,291, dated June 28, 1898.

Application filed August 18, 1897. Serial No. 648,697. (No model.)

*To all whom it may concern:*

Be it known that we, JOSEPH A. MENGEL, residing at McKeansburg, GEORGE K. BINKLEY, residing at Orwigsburg, and GEORGE H. GERBER, residing at Pottsville, in the county of Schuylkill and State of Pennsylvania, citizens of the United States, have invented certain new and useful Improvements in Potato Cutters and Planters; and we do hereby declare the following to be a full, clear, and exact description of the invention, such as will enable others skilled in the art to which it appertains to make and use the same.

Our invention relates to potato cutters and planters, has especial reference to improvements in means for cutting potatoes into quarters or halves and distributing the severed pieces for planting in furrows equidistantly, and consists in certain improvements in construction, which will be fully disclosed in the following specification and claims.

For the purpose of illustration we have shown our invention applied to our potato-planter patented March 31, 1896, and numbered 557,136; but it may be applied to other forms of planters or the cutter may be used for preparing potatoes for other forms of planters.

In the accompanying drawings, which form part of this specification, Figure 1 represents a side elevation; Fig. 2, a like view of the opposite side; Fig. 3, a vertical section; Fig. 4, a top plan view; Fig. 5, a cross-section on line 5 5, Fig. 3; Fig. 6, an inverted plan of the distributing or dropping hopper; Fig. 7, a like view showing the valve-operating mechanism in a different position; Fig. 8, a like view of the bottom of the hopper with the valve removed; Fig. 9, an end view showing a modified construction of the guide-chutes, and Fig. 10 a top plan view of the same.

Reference being had to the drawings and the letters and figures thereon, A indicates the main hopper or reservatory for potatoes. In the present instance for the purpose of illustration we have shown that form of means for supplying potatoes to the cutter employed in our patent to which reference has been made and will only be referred to briefly herein.

B indicates one of the spears which raise the potatoes above the hopper A and supply them to the receiving-chamber C of the cutter in the manner they supplied potatoes to the conductor in the former construction. This invention is not, however, limited or restricted in its use to any special means for supplying potatoes to the receiving-chamber C or to any special form of planter. D E indicate the sides of the cutter and planter, between which and the upper end thereof is located said receiving-chamber C, which chamber is provided with an inclined bottom $a$, preferably removable and secured by buttons $b\ b$ or other suitable devices, and with a guide or deflector F, pivotally secured to said bottom and vibrated laterally to direct potatoes alternately to both sides of the center of the cutting means, as shown in Figs. 3 and 4, or the guide may be made to direct the potatoes to the center, as shown in Fig. 7.

In the former construction the guide is provided with laterally-projecting fenders $c\ c$ to throw the potatoes to or toward the center of the space on each side of the guide, so that they will fall upon the knife G and be severed in two parts or halves. The guide F is provided with a cam $d$, which is struck by pins $e\ e$ on the shaft $f$ and vibrated alternately from one side to the other, so that the potatoes will be equally and regularly distributed to each half of the cutting mechanism and to the distributing-hopper. The shaft $f$ is supported in the sides D E, and one end of the shaft is provided with a wheel $g$, which is engaged by pins $h$ on the inside of the disk or annulus $h'$, secured to or forming part of the sprocket-wheel $i$, which is supported on shaft $k$ and engaged by belt $l$.

At the inner or discharge end of the chamber C is a "gate-plunger" H, so called for the reason that it serves a twofold purpose, in that it closes said end of the chamber C and controls the discharge of potatoes therefrom and forces or drives the potatoes down upon the knife G to sever them into two or four parts, as may be desired. The gate-plunger is of sufficient weight to drive the potatoes between the potato-supports K K', upon which they fall from the chamber C, separate the supports, and cause the knife or knives to sever the potatoes. The supports K K' are shown as revoluble rollers mounted upon shafts $m$ $m$, which work in slots $n$ $n$ in the sides of the cutter, are revolved by belts $l$ and $o$, respectively, and are supported by arms $p$ $p$, which engage the shaft $q$, having sprocket-wheels $r$ $s$, with which the belts $l$ and $o$ engage, and sprocket-wheel $t$ at the opposite side, to which power is applied from the axle of the vehicle, on which the planter is supported by a belt. (Not shown.)

The arms $p$ $p$ are provided with belt-tighteners $u$ $u$, and at their upper ends are connected by links $v$ $v$ to a rocking lever $w$, which limit the separation of the supports K K'. An additional belt-tightener $u'$ is applied to the belt $l$ and is provided with a spring $z$ to produce tension. The supports are restored to their normal condition (after the gate-plunger has been raised) by springs $x$ on one side and $y$ on the opposite side.

The gate-plunger H is supported by arms $a'$ $a'$, which engage a shaft $b'$, on which the gate-plunger vibrates vertically, is limited in its movement by links $c'$ $d'$, and is raised by an arm $e'$ on the disk or annulus $h'$ of the sprocket-wheel $i'$, which engages a curved arm $f'$, attached at its opposite end to the shaft $b'$.

The knife G is provided with blades $i'$ $i'$ and $k'$ $k'$, arranged at a right angle to each other.

Below the rear potato-support K' are vibrating supports $l'$ $l'$, connected to a shaft $m^2$, upon which the parts of potatoes which fall on that or rear side of the blades $i'$ $i'$ and rest there, while the parts which fall on the opposite or front side of the blades and have reached the distributing-hopper L are passing through the bottom of the hopper to the conducting-tube (not shown) and from it to a furrow.

The supports $l'$ $l'$ are operated by a bar $n'$ on one side of the machine, (shown in Fig. 2,) which is attached to an arm or lever $o'$, which is connected to the shaft $m'$, and the lower end of the bar $n'$ is engaged by pins $p'$ on the sprocket-wheel $t'$, which raise the arm and draw the supports downward, as shown in dotted lines in Fig. 3.

The distributing-hopper L is divided into four compartments 1 2 3 4, separated by partitions 5 6 7 8 and provided with a revoluble bottom 9, to which is attached a miter gear-wheel 10, which engages a like wheel 11 on shaft $q$, which is driven by sprocket-wheel $t$. The bottom 9 is provided with an opening 12, controlled by a valve 13 on the under side of the bottom. The valve is provided with a tripping-lever 14, which is pivotally secured to the bottom 9 at 15, is secured to the valve by a strap 16, in which the lever slides, and the free end of the lever engages lugs 17 on the inside of the wall of the hopper below the bottom and is held by the lugs until the opening 12 is in position under each compartment of the hopper and until the proper time to drop the potato or part of potato in the compartments, as shown in Fig. 6, when the end of the lever passes or is disengaged from the lug with which it is in engagement, as shown in Fig. 7, and the spring 18 instantly throws the valve under the next compartment of the hopper ready to receive the potato or part of potato and drop it. The valve thus serves to close the opening 12 as it approaches each compartment and uncover the compartment.

One end of spring 18 is secured to the bottom 9 at 19 and the opposite end is connected to the lever 14 at 20, so that the valve 12 is thrown from beneath compartment 1 to 2 and then to 3 and 4 in the revolution of the bottom 9.

The guide-chutes $p^2$ in Figs. 9 and 10 are fixed in the chamber C and converge toward the discharge end of the chamber to direct potatoes toward the center of the gate-plunger F, where they encounter the vertical groove $q'$, and when the gate-plunger is being raised the potatoes gravitate downward along the groove $q'$ until they fall upon the supports K K', which, being revolved in opposite directions or toward each other, draw the potatoes downward between them until they are struck by the gate-plunger and severed by the knife G, at which time they are again engaged by the revolving supports as soon as the gate-plunger is withdrawn from between the supports and the severed pieces pushed off the sides of the blades of the knife.

In the operation of the machine it is so timed that each compartment of the distributing-hopper L is discharged with absolute precision, and while compartments 3 and 4 are being discharged the gate-plunger is rising and falling and provides a supply of cut potatoes to compartments 1 and 2 of said hopper and another supply for 3 and 4, which rests upon the supports $l'$ $l'$.

Having thus fully described our invention, what we claim is—

1. A potato-cutter provided with a receiving-chamber, a movable gate-plunger controlling the discharge end of said chamber and forcing the potatoes downward, and a support for potatoes below the gate-plunger, in combination with a vertical knife below and intermediate said support.

2. A potato-cutter provided with a receiving-chamber, a movable gate-plunger controlling the discharge end of said chamber and forcing the potatoes downward, and laterally-movable supports for potatoes below said gate-plunger, in combination with a vertical knife below and intermediate said support.

3. A potato-cutter provided with a receiving-chamber, a movable gate-plunger controlling the discharge end of said chamber and forcing the potatoes downward, and movable supports for potatoes below the gate-plunger, in combination with a vertical knife below and intermediate said supports and a distributing-hopper.

4. A potato-cutter provided with a receiving-chamber, a gate-plunger controlling the discharge end of said chamber and forcing the potatoes downward, and a pair of revoluble potato-supports below the gate-plunger, in combination with a vertical knife below and intermediate said supports.

5. A potato-cutter provided with a receiving-chamber, a vertically-movable gate-plunger controlling the discharge end of said chamber and forcing the potatoes downward, and a pair of laterally-separable rollers, in combination with a knife below and intermediate said rollers.

6. A potato-cutter provided with a receiving-chamber, a pair of separable rollers, a gate-plunger above and intermediate the rollers controlling the discharge end of said chamber and forcing the potatoes downward, means for raising the gate-plunger and means for returning the rollers, in combination with a knife below and intermediate said rollers.

7. A potato-cutter provided with a receiving-chamber having a guide or deflector, and a gate-plunger controlling the discharge end of said chamber and forcing the potatoes downward, laterally-movable supports for potatoes below the gate-plunger and a knife for severing potatoes, in combination with a distributing-hopper.

8. A potato-cutter consisting of a pair of laterally-separable potato-supports, a vertical knife below and intermediate said supports and extending downward into and forming a partition for a distributing-hopper, in combination with said hopper and vibratory supports for parts of potatoes above said hopper.

9. A potato-cutter provided with means for severing potatoes, in combination with a distributing-hopper having a horizontally-revoluble bottom provided with a discharge-opening, a valve controlling the opening, a pivoted lever connected to said valve and means on the hopper for engaging the lever.

10. A potato-cutter provided with a distributing-hopper having a horizontally-revoluble bottom and provided with a partition having a potato-cutting knife at its upper end, an opening in the bottom, a valve controlling said opening, a lever pivotally secured to the bottom and connected to said valve, lugs on the hopper for engaging said lever and a spring connected to the lever for moving the valve.

11. A potato-cutter provided with a receiving-chamber, a gate-plunger controlling the discharge end thereof and forcing the potatoes downward, means for severing potatoes, and a distributing-hopper, in combination with means connecting the distributing-hopper and the cutting mechanism.

12. A potato-cutter provided with a receiving-chamber having a movable guide or deflector, a gate-plunger controlling the discharge end of said chamber and forcing the potatoes downward, laterally-movable potato-supports, and means for severing potatoes, in combination with a distributing-hopper.

In testimony whereof we affix our signatures in presence of two witnesses.

JOSEPH A. MENGEL.
GEORGE K. BINKLEY.
GEORGE H. GERBER.

Witnesses:
THOS. B. ZULICK,
ROBERT L. BOCK.